Figure 1:
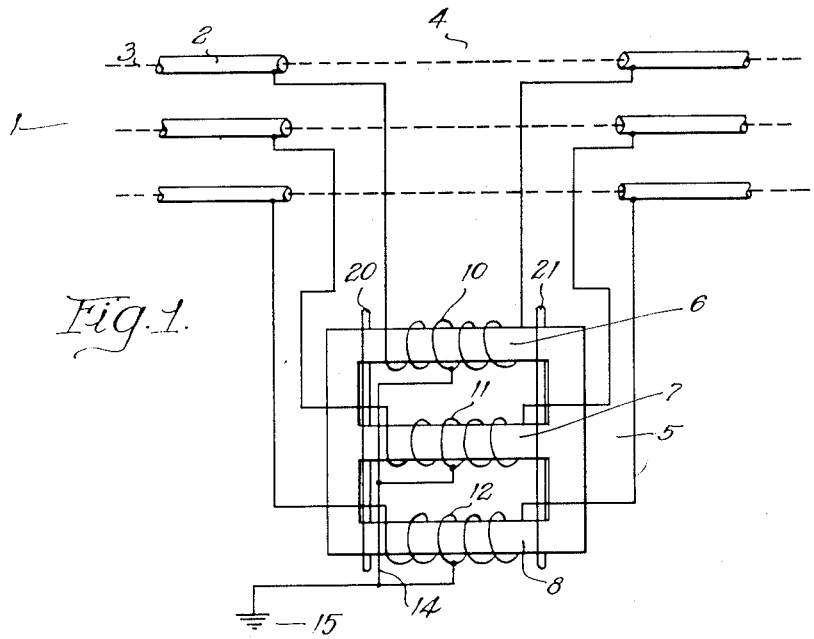

July 7, 1931.  H. HALPERIN ET AL  1,812,949

TRANSFORMER

Original Filed Nov. 30, 1927

Inventors:
Herman Halperin
Kenneth W. Miller
By Brown, Jackson, Boettcher & Dienner
Attys.

Patented July 7, 1931

1,812,949

UNITED STATES PATENT OFFICE

HERMAN HALPERIN AND KENNETH W. MILLER, OF CHICAGO, ILLINOIS

TRANSFORMER

Original application filed November 30, 1927, Serial No. 236,634. Divided and this application filed May 29, 1930. Serial No. 456,888.

This application is a division of our pending application Serial No. 236,634, filed November 30, 1927, and relates to electrical transformers in general and more specifically to such transformers as are particularly adapted for bonding cable sheaths in electrical systems.

It was formerly the practice in the underground three-phase transmission of alternating currents to place the three conductors in a single cable but as the values of the voltages and currents increase, in accordance with modern practice, this often becomes impracticable. This resulted in the adoption of a method in which the conductors are placed in separate cables, which are placed in suitable conduits underground. These cables are arranged substantially parallel and, of necessity, are not placed very far apart. In this arrangement several serious problems arise, due to induced sheath voltages or currents.

When alternating currents flow in the conductors of single conductor cables, there is induced a voltage in each sheath, and this voltage is directly proportional to the current and the length of each section of cable sheath between the manholes. If the sheaths of the three cables are connected by the ordinary method, which is solid bonding in each manhole, then this induced voltage causes a large current to flow in the sheath, with resultant heat losses that considerably reduce the current carrying capacity of the cable; for instance, about twenty-five per cent on single conductor 750,000 c. m. cables operating at 66 k. v., three phase, 60-cycle in ducts on six inch centers. If, however, the sheath lengths are made discontinuous by insulating joints and are specially connected by bonds or impedances, the flow of current may be prevented in the sheaths or greatly restricted, and the sheath losses practically eliminated. In this case the induced sheath voltages are not consumed in producing sheath current and are therefore present on the sheath.

In our parent application above referred to, of which the present application is a division, we show an arrangement for preventing or greatly reducing sheath losses in single conductor cables. This is accomplished by dividing the sheaths into approximately equal electrically discontinuous sections by means of insulating joints. These sections are then either cross bonded continuously throughout the line and interconnected at approximately equal intervals by a "star" connected three phase transformer, or the sections are all series connected through transformers each phase winding of which bridges the insulating joint of a cable phase, the transformer windings being further interconnected at a common neutral or mid tap. In either case the neutral or mid tap is preferably (although not necessarily) grounded to earth or to other cable sheaths.

The transformer is of novel construction which is the subject of this application. The transformer is provided with three parallel legs in a closed magnetic circuit, the three legs each supporting one primary coil. The primary coils for connection to the sheath may be either star connected or series wound with interconnected neutral or mid taps (equivalent to a six pointed star) depending for which sheath bonding connection the transformer is intended.

There is provided a low resistance, low impedance secondary which is delta connected. The secondary may be wound in the usual manner if desired, each coil thereof being of very few turns. An alternate method is to place a bar of copper around both (or one) end of the transformer, each bar constituting a short circuited coil of a single turn embracing all three legs of the transformer.

Under normal operating conditions for either sheath bonding connection the voltages impressed upon the three primary coils are of the same magnitude and 120 degrees apart. The normal three phase reactance of the primary coils is high, only a small exciting current flows, and the losses are negligible. The secondary winding is the equivalent of three delta connected coils, and, since the voltages induced in the three coils would be equal and 120 degrees apart their resultant is zero and there is no current flowing through the secondary.

The secondary coils therefore function normally only as a tertiary winding preventing the flow of triple harmonic current in the sheaths.

When a fault occurs on one of the lines there will be a greater voltage induced in the corresponding cable sheath than in the other sheaths. The vector sum of the currents flowing in the three primary windings of the transformers will not be zero and a voltage will be induced in the secondary. Due to the fact that the secondary comprises a short circuited coil of very low resistance there will be a very large current flow in the secondary with the result that the primary impedance is reduced to a very low value for this unbalanced current. The transformer will therefore act as a short circuit to the excess sheath voltages induced in the sheath of the cable carrying the fault current preventing or neutralizing excess induced sheath voltages. The fault current returning through the sheath circuit to the ends of the line will divide in the coil windings of transformers adjacent to the failure and return about equally divided in the three sheaths. For this single phase current flowing in parallel through the transformer windings along the remainder of the line, or flowing off to other parallel ground return paths, the secondary winding causes the device to function as short circuited transformers of very low impedance. This results in minimum total impedance drop along the return current path and minimum excess sheath voltage for returning failure currents.

As previously stated, the secondary of the transformer may comprise two bars of copper each of which is placed around one end of the transformer. It is within the purview of the present invention to use a secondary comprising a single bar of copper or any other desired number of bars of copper. If desired, the secondary may be wound, but this is more expensive.

In order to acquaint those skilled in the art with the manner of constructing and operating a device of our invention we shall describe in connection with the accompanying drawings a specific embodiment thereof and the manner of making the same, from which the attainment of the above and other objects of the present invention will be apparent.

In the drawings—

Figure 2:
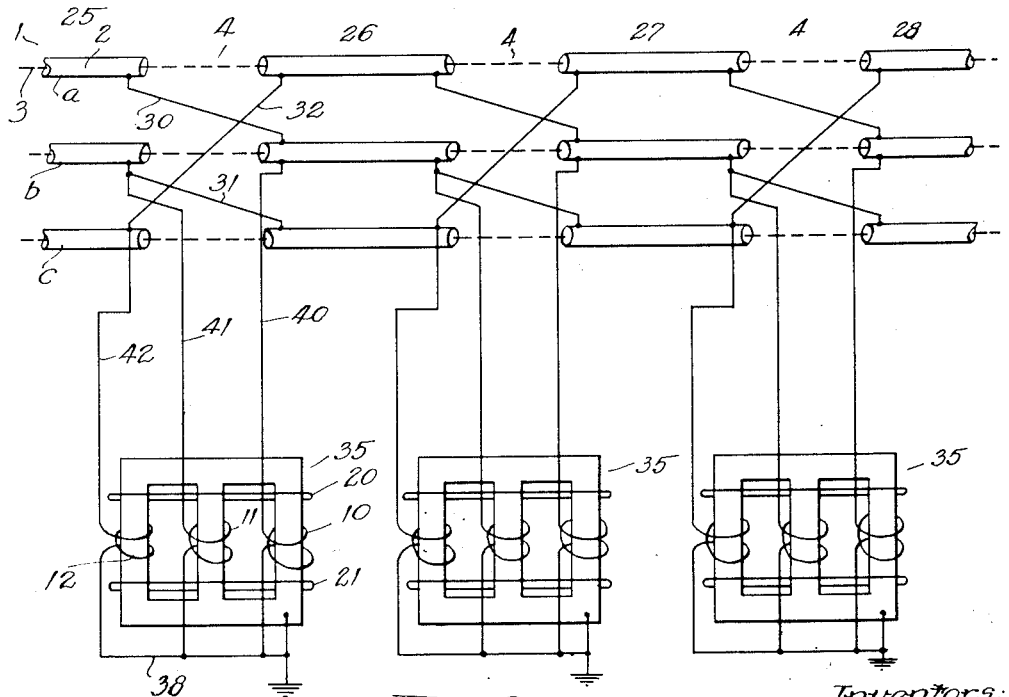

Figure 1 is a diagrammatic view of our invention showing the manner of connecting the transformer so that the primary coils thereof are in series with the adjacent sheaths of the respective cables; and Figure 2 is a diagrammatic view of a modified form of our invention wherein the cable sheaths are transposed and the primaries of the transformers are connected between the respective sheaths and ground.

Reference may now be had more particularly to Figure 1 wherein we have shown our invention applied to a three-phase system. A three phase-transmission system employing three single phase sheathed cables is indicated at 1. Each of the cables comprises a sheath 2 and a conductor 3. The sheaths of each cable are divided into sections insulated from one another and of a length preferably equal to the distance between manholes. One of these insulated sections is indicated diagrammatically at 4. In each of the manholes where insulating joints 4 are located we provide a transformer 5. Each of the transformers is provided with three parallel core legs 6, 7, and 8 in a closed magnetic circuit. Three primary windings 10, 11, and 12 are provided for the respective core legs. The mid points of the three primary windings are connected together by means of a conductor 14 and are preferably grounded or connected to other cable sheaths usually at ground potential as indicated at 15. The opposite ends of the primary winding 10 are connected to the cable sheath 2 of one of the phase cables on the respective sides of the insulating joint 4. In a like manner the two ends of the primary winding 11 are connected to the sheaths at the opposite sides of the joint 4 of one of the other cable conductors, and the primary winding 12 is connected in a similar manner to the third conductor. The transformer 5 is provided with two secondaries indicated at 20 and 21 respectively. Each of these secondaries may comprise merely a bar of copper wound around the entire core in the form of a single closed loop. If desired, each of the secondaries may take the form of a two piece clamp which also serves to hold together the laminations at the ends of the iron core of the transformer. Such a clamp would of course be made of a material such as copper so as to have a very low resistance and to constitute the secondary of the transformer. In any case the secondary is preferably made to have a very low resistance and a very low reactance.

In Figure 2 we show our improved transformer connected in a somewhat different manner and used on a system wherein the cable lengths are connected together by cross-bonding. The sheaths of the respective cables are, as before, divided into sections insulated from one another and of a length preferably equal to the distance between manholes. The sections are indicated at 25, 26, 27, and 28, the respective sections being insulated from one another by suitable insulating joints 4. The insulating joints are located in the manholes in the customary manner although the joints may also be located at other points if required. At each of the insulated joints the cable sheaths are connected in three-phase transposition by cross-bonding. The sheath of the "a" phase of one section is connected by a conductor 30 to the sheath of the "b" phase of the adjacent section; the sheath of the "b" phase of one section is connected to the sheath of the "c" phase of the adjacent section by means of a conductor 31; and the sheath of the "c" phase of one section is connected to the sheath of the "a" phase of the adjacent section by a conductor 32. This cross-bonding is repeated with the same phase sequence at each of the manholes where insulated joints, such as the joints 4 are located.

In every manhole where an insulating joint 4 is located we provide a transformer 35. This transformer is substantially the same as the transformer 5 previously described, differing therefrom only in that the windings 10, 11, and 12 are not provided with a tap at the mid point. The windings of the transformer 35 are connected in circuit in a manner different from the connections previously described in connection with Figure 1. The three primary windings are connected in star by means of a conductor 38 which is preferably, although not necessarily, grounded. The grounding connection may be obtained by connecting the conductor 38 to the sheath of some other cables that may be located in the proximity of the conductors of the line 1. The opposite ends of the primaries 10, 11, and 12 are connected to the respective cable sheaths of the "a", "b", and "c" phase conductors by means of the conductors 40, 41, and 42, respectively. The transformer is provided with two secondaries in the same manner as is the transformer previously described.

Since the function of the star connected transformers during normal operation is to provide an artificial neutral grounding point the transformers need not be installed at every section length. The only requirements are that this should be installed at equal intervals not a multiple of three (the number of phases) and not so far apart as to lose control of normal voltages due to irregular conduit lengths nor so far apart as to cause excessive voltage during failures, because of return current being confined to one cable sheath, instead of having early opportunity to divide between sheaths and ground at a transformer. For three-phase systems the most practical interval is at every second cross-bond location although intervals of 1, 2, 4, or 5 section lengths are workable.

An explanation will now be given of the manner of operation of the system shown in Figure 2 from which the manner of operation of the system shown in Figure 1 will be readily apparent. It is evident that during normal operation, three-phase sheath voltages are applied to the transformer primaries and the vector summation of the voltages in the delta connected secondaries is zero. Therefore during normal operation no current will flow in the secondary windings and the current flow in the primary coils will be limited to exciting current necessary to establish the flux which is required to cause an induced voltage equal and opposite to the applied or sheath voltage. As is well known this exciting current is small. It can easily be seen that the normal operation of our present invention is identical to that of an ordinary three-phase transformer bank with no load on the delta connected secondary.

During failures either one or both of two different effects may be produced. First, the conductor currents may become unbalanced due to the current flowing out to the failure and as a result the induced sheath voltages applied to the transformers become increased in magnitude and distorted in phase. Secondly, the returning failure current will return to the station end of the line all or in part over the sheaths of the cables and also may divide over independent ground paths by flowing through the primary coils and the grounded neutral connection of the transformers, where such additional parallel return paths may exist.

It is well known that the voltage induced in the secondary of a transformer is almost exactly proportional to the voltage applied to the primary. Now the applied voltages which are induced in the cable sheaths by currents in the copper conductors are directly proportional to the conductor currents. Therefore, if during failure the vector summation of conductor currents is not zero, then the vector summation of voltages induced in the delta connected secondaries of the transformers is not zero and the secondary acts as a short circuited winding for that amount of voltage by which the vector triangle fails to close. Since the short circuit impedance of a transformer can be made very low, the impedance drop for the unbalanced component of the sheath voltage will be very low and large induced currents will flow in the sheaths. These currents will consume the unbalanced component of induced voltage in the sheaths and neutralize it where it is generated.

Normal sheath voltage at full load is usually about 10 volts per cable length and short circuit currents seldom exceed 10 times normal full load value so that an induced voltage of 50 to 100 volts between cable sheaths and ground would seldom be exceeded. Due to the short circuit action of the transformer on the unbalanced component of induced voltages, they would be reduced to about one third value depending on the connection and transformer design. Temporary sheath voltages of this value are harmless and inconsiderable in comparison with cumulative voltages along the cable sheath circuit caused by returning failure current about to be described. Failures between phases not involving failure to ground would result in conductor current summation equal to zero and the above described protective action would not occur. However such faults are not frequent and in many cases are impossible on single conductor cable lines.

The returning failure current is most important from the standpoint of resulting sheath voltage drop cumulative along the line. Single conductor cable lines are often installed in isolated conduits which may be quite dry. In such cases the failure current is forced to return long distances toward the terminal station over the cable sheaths of the line in trouble. Since the sheath impedance voltage drop is cumulative along the line it is very important that the sheath bonding connection present a small impedance to such return currents. With our invention used in connection with Figure 2 after current division in the transformers adjacent to the failure, no impedance is added to that of the cable sheaths and bond wires of the sheath circuit itself.

Necessarily the return current from a phase to ground failure must be single-phase in value. The action of the transformer adjacent the fault is exceedingly complicated and need not be discussed in this application. Suffice it to say that current will flow from the cable sheath at the fault through the corresponding coil of the transformer and will divide through the other two coils and will travel back along the three sheaths of the three cables. Also in these coils some current will flow through the neutral to ground or to additional parallel paths, if present. At the next and the subsequent manholes where the transformers are located current will flow out through all three of the transformer coils in the same direction to other return ground circuits if present. Otherwise these transformers will not be in the return circuit at all. There will thus be a transformer action in all transformers handling single phase or unbalanced currents. Due to the very low resistance of the secondary large secondary current will flow in such cases, thus greatly reducing the reactance of the primary windings. This action is similar to what takes place in a short-circuited current transformer.

Thus it may be seen that we have provided an arrangement which will prevent the flow of large three-phase sheath currents during normal operation but will permit returning failure current to pass in any direction practically without obstruction and, furthermore, it will act as a short circuit to any cumulative induced sheath voltage. Otherwise stated, the combiantion acts as a variable valve allowing heavy current to pass during abnormal conditions but preventing appreciable current flow during the normal operation.

Also, as is well known, triple harmoic exciting current can flow in the delta connected secondary and therefore will not be present in the sheath circuit where it might give trouble by inductive interference with telephone cables in parallel conduits. Since all these effects are exactly those desired in operation, the transformer combination is ideal for the purpose of sheath bonding.

It is obvious that the scheme is applicable to single phase, two, four or six phase circuits or in fact any circuit with two or more cables and in the above description and in the following claims, we do not intend to limit ourselves to the common three-phase arrangements shown, unless the claims so particularly specify.

In order to withstand the large temporary current that may flow during failures, it is necessary to use copper of large cross section for the coils. For thermal and electrical reasons it is advisable to make the total cross section of the secondary winding about the same as the primary.

In compliance with the requirements of the Patent Statutes, we have herein shown and described two preferred embodiments of our invention. The invention is however not limited to the precise arrangement herein shown, the same being merely illustrative. What we consider new and desire to secure by Letters Patent is:

1. As an article of manufacture, a sheath bonding transformer having a core provided with a plurality of legs, a phase winding on each core leg and comprising a primary of the transformer, and a common secondary winding around all of the core legs, said secondary winding comprising a copper ring of a single turn.

2. As an article of manufacture, a sheath bonding transformer having a core provided with a plurality of legs, a phase winding on each core leg and comprising a primary of the transformer, and a common secondary winding around all of the core legs, said secondary winding comprising a copper ring at one end of the transformer and a second copper ring at the other end of the transformer.

3. As an article of manufacture, a sheath bonding transformer having a core provided with a plurality of legs, a phase winding on each core leg and comprising a primary of the transformer, said phase windings being conductively connected together in star, and a common secondary winding around all of the core legs, said secondary winding comprising a copper ring of a single turn.

4. As an article of manufacture, a sheath bonding transformer having a core provided with a plurality of legs, a phase winding on each core leg and comprising a primary of the transformer, said phase windings being conductively connected together in star, and a common secondary winding around all of the core legs, said secondary winding comprising a copper ring at one end of the transformer and a second copper ring at the other end of the transformer.

5. A three phase transformer comprising three magnetic branches, separate phase windings for the respective branches, and a short circuited secondary encircling all three of the magnetic branches.

6. A three phase transformer comprising three magnetic branches, separate phase windings for the respective branches, and a short circuited secondary encircling all three of the magnetic branches, said secondary comprising a single turn.

7. A sheath bonding transformer for a polyphase line comprising a plurality of primary windings adapted to be connected to the sheaths of the cables of a line and a secondary winding comprising a short circuited coil permeated by substantially all of the flux produced by any one of the primary coils when the other coils are electrically inactive.

8. A sheath bonding transformer comprising a plurality of magnetic portions connected in parallel, electrically separate primary windings on the respective portions, and a secondary winding comprising a short circuited coil into which all of said magnetic portions extend.

In witness whereof, we hereunto subscribe our names this 27th day of May, 1930.

HERMAN HALPERIN.
KENNETH W. MILLER.